United States Patent
Zhu et al.

(10) Patent No.: US 11,888,282 B2
(45) Date of Patent: Jan. 30, 2024

(54) LASER DRIVING DEVICE AND METHOD FOR ENABLING UNIFORM LIGHT FIELD

(71) Applicant: Shanghai Institute of Optics And Fine Mechanics, Chinese Academy of Sciences, Shanghai (CN)

(72) Inventors: Jianqiang Zhu, Shanghai (CN); Xiaoqi Zhang, Shanghai (CN); Gengxiu Tang, Shanghai (CN); Hua Tao, Shanghai (CN); Zhigang Liu, Shanghai (CN)

(73) Assignee: Shanghai Institute of Optics And Fine Mechanics, Chinese Academy of Sciences, Shanghai (CN)

( * ) Notice: Subject to any disclaimer, the term of this patent is extended or adjusted under 35 U.S.C. 154(b) by 268 days.

(21) Appl. No.: 17/221,702

(22) Filed: Apr. 2, 2021

(65) Prior Publication Data
US 2021/0320471 A1 Oct. 14, 2021

(30) Foreign Application Priority Data
Apr. 13, 2020 (CN) .......................... 202010283442.7

(51) Int. Cl.
*H01S 3/08* (2023.01)
*H01S 3/06* (2006.01)
*H01S 3/109* (2006.01)
*H01S 3/094* (2006.01)

(52) U.S. Cl.
CPC .............. *H01S 3/08* (2013.01); *H01S 3/0602* (2013.01); *H01S 3/094* (2013.01); *H01S 3/109* (2013.01)

(58) Field of Classification Search
CPC ... H01S 3/06; H01S 3/08; H01S 3/092; H01S 3/169
See application file for complete search history.

(56) References Cited

U.S. PATENT DOCUMENTS

| | | | | |
|---|---|---|---|---|
| 5,625,738 A | * | 4/1997 | Magarill | G02B 27/1046 359/503 |
| 5,684,566 A | * | 11/1997 | Stanton | G03F 7/70141 355/71 |
| 2016/0195236 A1 | * | 7/2016 | Kita | G03B 21/208 362/235 |
| 2018/0341120 A1 | * | 11/2018 | Zhang | H01S 3/0804 |

(Continued)

OTHER PUBLICATIONS

Rota-Rodrigo, "Watt level green random laser at 532 nm by SHG of a YB doped fiber laser," 2018, Optics Letters, vol. 43, No. 17, pp. 4284-4287. (Year: 2018).*

(Continued)

*Primary Examiner* — Michael Carter
(74) *Attorney, Agent, or Firm* — Mei & Mark LLP; Manni Li

(57) ABSTRACT

A laser driving device and a method for enabling a uniform light field, wherein the laser driving device is a high-power laser driving device that enables a uniform light field on the basis of a narrow-band low-spatial-coherence light and is provided for laser fusion. The narrow-band low-spatial-coherence light is configured as a seed of the laser driving device, an amplification and transmission unit amplifies the seed, a frequency conversion unit converts a frequency of the laser, and a focusing component is configured for laser focusing and uniform illumination.

11 Claims, 6 Drawing Sheets

(56) References Cited

U.S. PATENT DOCUMENTS

2018/0366897 A1* 12/2018 Wang .................... H01S 3/0675

OTHER PUBLICATIONS

Deng, "Uniform illumination of large targets using a lens array," 1986, Applied Optics, vol. 24, No. 3, pp. 377-381. (Year: 1986).*
Babin, "Second harmonic generation of a random fiber laser with Raman gain," 2015, Proceeding of SPIE, vol. 9347, p. 934710-1-934710-9. (Year: 2015).*

* cited by examiner

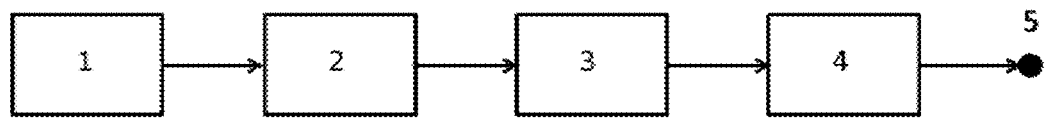
FIG. 1
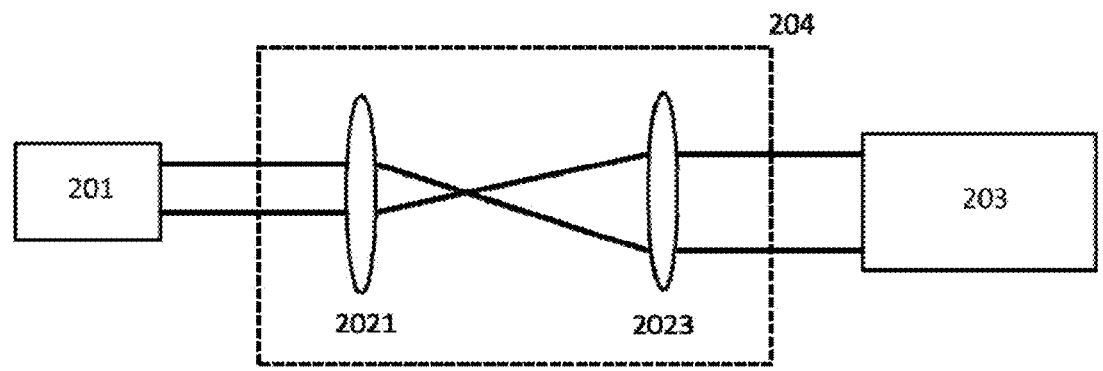
FIG. 2A
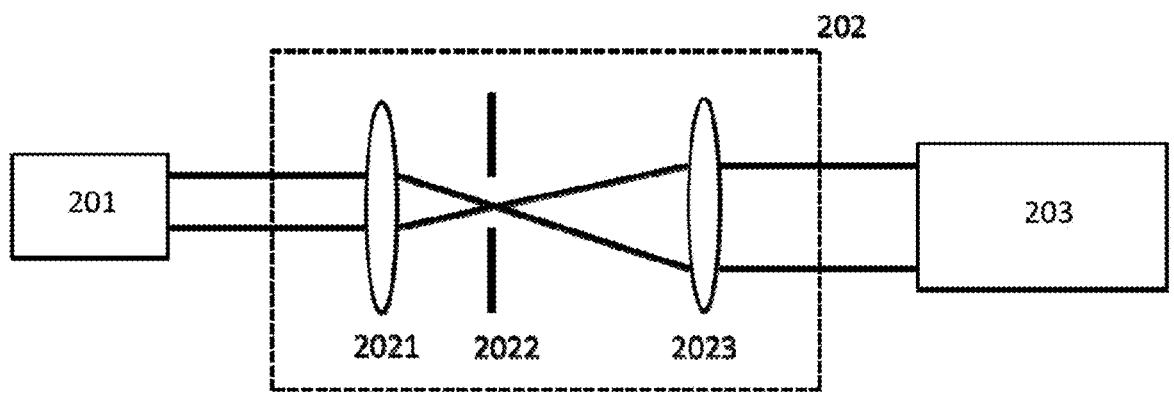
FIG. 2B  - Prior Art -

FIG. 3B -- Prior Art --

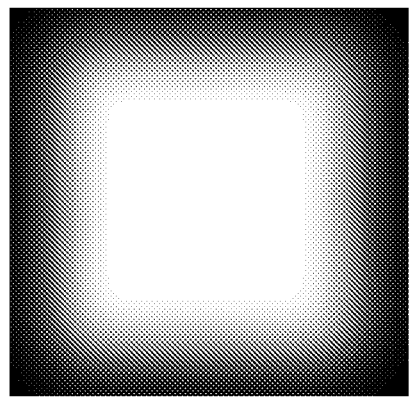 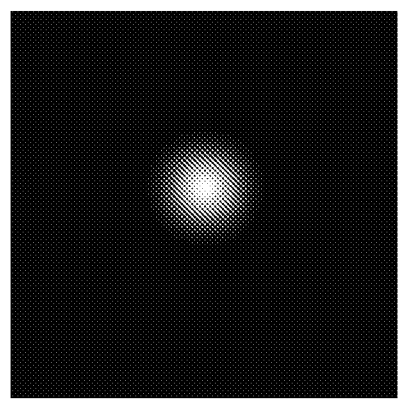
FIG. 5A  FIG. 5B
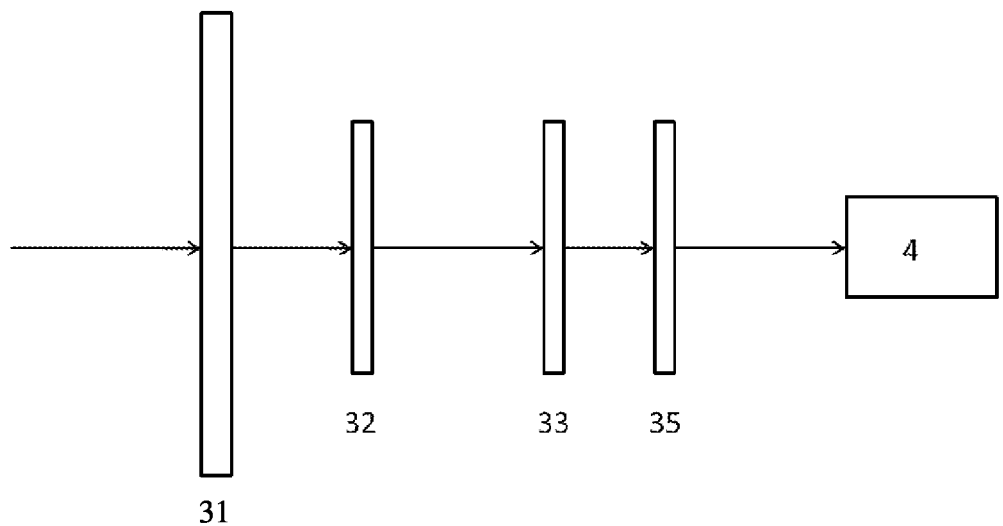
FIG. 6
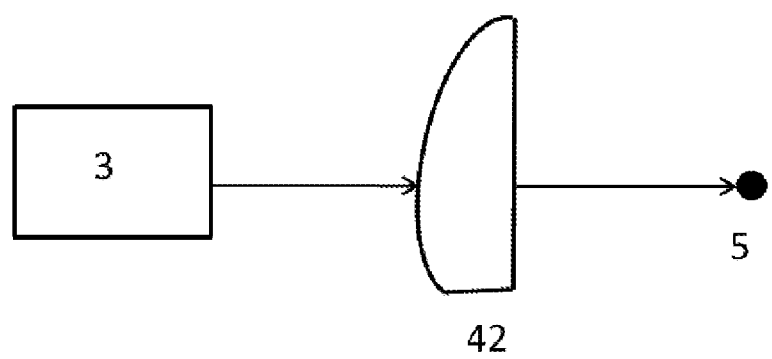
FIG. 7

LASER DRIVING DEVICE AND METHOD FOR ENABLING UNIFORM LIGHT FIELD

CROSS-REFERENCE TO RELATED APPLICATIONS

The subject application claims priority to Chinese Patent Application No. 202010283442.7 filed Apr. 13, 2020 in China. The Chinese priority application is incorporated herein by reference.

TECHNICAL FIELD

The present invention relates to lasers, and particularly, a laser driving device for laser fusion research and a method for enabling a uniform light field.

BACKGROUND ART

In a high-power laser driver for inertial confinement fusion, during the implosion process, the non-uniform light field irradiating the target surface will cause the fluid instability and the instability of the laser-plasma interaction, leading to the failure of the experiment. At present, the major solution is to combine spatial-domain beam smoothing and time-domain beam smoothing to solve the problem of light field non-uniformity, but it fails yet to meet the experimental requirements on the uniformity. A broadband light source is also adopted for beam smoothing, but this method cannot achieve high-efficiency amplification and frequency conversion efficiency. Moreover, in the current laser driving device, the nonlinear self-focusing caused by the phase disturbance generated by the spatial coherence of the laser in transmission and amplification brings damage to optical elements, as a result, the damage resistance capability of final optics assembly of the laser driver is limited. Based on high power laser devices with low spatial coherence, the present invention can not only further increase the energy of the laser output, but also realize uniform irradiation of physical experiments.

In the current laser driving device, phase disturbance and poor light field uniformity cause self-focusing and thus damage to elements, as a result, the laser output is limited. In the current technology, the broad spectral band technique is void of efficiency and high-energy output, and the combination of spatial-domain beam smoothing and time-domain beam smoothing can not yet meet the experimental requirements on the uniformity.

SUMMARY OF THE INVENTION

The present invention provides a high-power laser device with low spatial coherence, which not only further improves the energy output of the laser, but also realizes uniform irradiation in a physical experiment. To solve the problems in the current technology, the present invention provides a laser driving device based on a narrow-band low-spatial-coherence light source.

Currently, spatial-domain beam smoothing needs to work with time-domain beam smoothing, because the incident light field is a highly coherent light field spatially, and the sub-beams divided by spatial-domain beam smoothing module are also coherent, so that a high-frequency modulated light field is generated, where the spatial distribution of speckles does not change during a whole pulse, which is unfavorable for implosion. By increasing the number of independent speckles in the coherence time, time-domain smoothing can eliminate the non-uniformity of higher-order modes integrally in a whole timeframe. However, only some high-frequency information can be eliminated, and the uniformity of the light field can not yet meet the experimental requirements at present.

The inventor found that the technical solution of the spatial-domain beam smoothing in conjunction with the time-domain beam smoothing is feasible, because essentially the solution is to regulate and control a spatial highly coherent light field and a localized modulation does exist in a specific spatial-domain and time-domain which is only shown as a uniform distribution when integrating over the whole time-domain. Therefore, the present invention provides a laser driver taking a light from a narrow-band low-spatial-coherence light source as a seed. As such, a laser light field with low spatial coherence is obtained after amplification, and the problem that the irradiation uniformity of the light field does not change with time and space is solved.

In the present invention, in the transmission and amplification of a low-coherence light, various damage caused by interference modulation similar to the situation in a laser device of the current technology is greatly reduced, so that the damage resistance capability of the laser driving device is improved. The matching angle of the current frequency doubling and frequency tripling crystals is small, and thus, renders poor efficiency in broad band frequency doubling conversion. Therefore, the present invention provides that not only low spatial coherence but also a narrow band should be fulfilled. According to the present invention, by advantage of adjustment of thresholds for a laser cavity and the gain narrowing effect of a laser gain medium, the fluorescence spectrum of the gain medium is narrowed to meet the requirement on the matching angle for frequency conversion, as a result, high efficiency in frequency conversion is available, and the overall efficiency of the laser driver is improved.

The details of the technical solution of the present invention are as follows:

A laser driving device, taking a narrow-band low-spatial-coherence light source as a seed, to carry out efficient amplification and transmission and frequency conversion and finally realize uniform irradiation on a target surface.

The laser driving device of the present invention comprises a laser seed (1), an amplification and transmission unit (2), a frequency conversion unit (3), and a focusing unit (4); wherein the laser seed (1) is a narrow-band low-spatial-coherence light source and is configured for generating a narrow-band low-spatial-coherence laser, the amplification and transmission unit (2) is configured for amplifying and transmitting the laser, the frequency conversion unit (3) is configured for converting frequencies of the laser, and the focusing unit (4) is configured for laser focusing; the laser seed (1) generates a narrow-band low-spatial-coherence light, the narrow-band low-spatial-coherence light is amplified by the amplification and transmission unit (2) and is subjected to frequency conversion performed by the frequency conversion unit (3), and then the light with a converted frequency is focused by the focusing unit (4).

In the present invention, the laser seed (1) is a low-spatial-coherence light source with a bandwidth not more than 10 Å. For example, for a KDP crystal in the process of frequency tripling, upon type II phase matching, if the bandwidth is 5 Å, the efficiency of frequency tripling conversion can be ensured to reach 60-70%; if the bandwidth is increased to 9

Å, the efficiency of frequency tripling conversion is 50-60%, reduced by 15% compared with the case that the bandwidth is 5 Å.

In the present invention, the laser seed (1) is a low-spatial-coherence light source, that is, according to Van Cittert-Zernike theorem, a modulus of a complex spatial coherence of a laser light field is less than 1, more preferably less than 0.5.

In the present invention, the amplification and transmission unit (2) has a laser amplification and transmission function and comprises one or more amplification gain media; the amplification gain medium can be rod-shaped, sheet-shaped, or the like; the laser can pass through one amplification gain medium for once or multiple times to obtain a desirable gain amplification.

In the present invention, the amplification and transmission unit (2) further comprises a spatial transmission device for controlling a divergence angle of a light beam, and regulation and control of the laser beam in transmission can be realized.

In the present invention, the amplification and transmission unit (2) further comprises a spatial filter, and the spatial filter is simplified on the basis of a conventional spatial filter, so that the amplification and transmission unit (2) has a simpler structure.

In the present invention, the frequency conversion performed by the frequency conversion unit (3) can be frequency doubling, frequency tripling, or frequency quadrupling.

In the present invention, the focusing unit (4) comprises an optical element for focusing.

In the present invention, the optical element for focusing is one of an aspheric lens, a reflective focusing lens, and a wedge-shaped focusing lens.

In the present invention, the focusing unit (4) may further comprise arrayed lenses or arrayed orthogonal cylindrical lenses.

In the present invention, the focusing unit (4) may further comprise an optical element for adjusting phases.

In the present invention, the optical element for adjusting phases is a deformable reflective lens.

In the present invention, the laser driving device may further comprise a beam shaping component (6).

In the present invention, the beam shaping component (6) is configured for controlling intensities and phases of a light beam.

In the present invention, the beam shaping element (6) is one or more of a serrated aperture, a birefringent lens group in conjunction with a neutral density filter, an amplitude-type (or phase-type) binary optical panel, a binary transmittance liquid crystal cell, an amplitude-type electrical addressing modulator, an amplitude-type optical addressing modulator, a phase-type electrical addressing spatial light modulator, and an adaptive optical component.

In the present invention, the laser driving device may further comprise a measurement unit (7).

In the present invention, the measurement unit (7) is configured for measuring various signals in the laser driving device.

In the present invention, the laser driver may further comprise a collimation component (8).

In the present invention, the collimation component (8) is configured for collimating each light beam in the laser driving device.

In the present invention, the laser driving device may further comprise a control component (9).

In the present invention, the control component (9) is configured for controlling various signals in the laser driving device.

The present invention also provides a method for enabling uniform focal spots, where a narrow-band low-spatial-coherence light source is adopted as the laser seed (1), amplification is carried out by the amplification and transmission unit (2), the amplified light is subjected to frequency conversion performed by the frequency conversion unit (3), and the light with a converted frequency is focused by the focusing unit (4) to enable a light field with uniform near and far fields.

Compared with the current technology, the laser driving device based on the narrow-band low-spatial-coherence light can effectively break through the limits on power energy, ultraviolet damage resistance capability and irradiation uniformity in a high-power laser device of the current technology, specifically, (1) uniform light field irradiation, which is the most important issue in physical experiments, is realized;

(2) the problem of low efficiency in amplification and frequency conversion caused by a broad spectral light source is overcome; and (3) the problem of damage to the optical element, i.e., filamentation, caused by the nonlinear effect in the laser driving device is solved.

In addition, the present invention features a simple structure, convenience in adjustment, high efficiency and feasibility, and good practicability. The device is simplified on the basis of a conventional device by, for example, removing the conventional spatial-domain and time-domain beam smoothing components and the function of spatial filtering. A brand-new laser driver is provided for laser fusion and contributory to fusion ignition driven directly and indirectly.

BRIEF DESCRIPTION OF THE DRAWINGS

FIG. 1 shows a simplified structure of the present invention.

FIG. 2A shows a structure of a spatial filter in an amplification and transmission unit (2) of a laser driving device according to the present invention; FIG. 2B shows a structure of the spatial filter in the amplification and transmission unit (2) of a convention laser driving.

FIG. 3B shows the frequency conversion unit (3) of the conventional laser driving device (frequency tripling).

FIGS. 5A and 5B show a near-field (FIG. 5A) and a far-field (FIG. 5B) of a light field after amplification and transmission and frequency conversion according to the present invention.

FIG. 6 shows the frequency conversion unit (3) of the laser driving device according to the present invention (frequency quadrupling).

FIG. 7 shows the focusing unit (4) of the laser driving device according to the present invention.

Figure 3A:
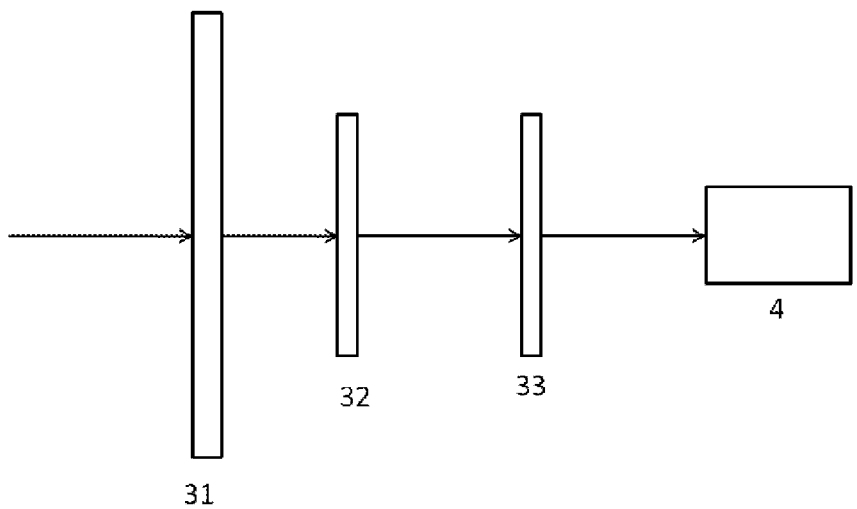
FIG. 3A shows a frequency conversion unit (3) of the laser driving device according to the present invention (frequency tripling)

Reference numbers used in the figures refer to the following structures:

1—laser seed; 2—amplification and transmission unit; 3—frequency conversion unit; 4—focusing unit; 5—target; 6—beam shaping component; 7—measurement unit; 8—collimation component; 9—control component;

202—spatial filter; 201—pre-amplifier stage; 203—post-amplification stage; 2021—first beam expanding lens; 2022—spatial filtering aperture; 2023—second beam expanding lens, 204—simplified spatial filter; 205—¼ wave plate; 206—rod-shaped laser head of amplification gain medium; 207—first polarizing beam-splitter prism; 208—intracavity spatial filter; 209—first reflective lens; 210—second polarizing beam-splitter prism; 211—spatial transmission filter; 212—Faraday rotator; 213—second reflective lens; 214—beam expander; 215—first sheet-shaped laser head of amplification gain medium; 216—first spatial filter; 217—second sheet-shaped laser head of amplification gain medium; 218—polarizing emission lens; 219—first total reflection lens; 220—second total reflection lens; 221—second spatial filter; 222—spatial transmission device; 2221—first lens; 2222—second lens;

30—fundamental-frequency random-phase mask; 31—vacuum window; 32—frequency doubling crystal; 33—frequency tripling crystal; 34—frequency-doubling random-phase mask; 35—frequency quadrupling crystal;

41—aspheric lens; 42—wedge-shaped focusing lens; 43—deformable reflective lens; 44—arrayed lenses; 45—beam deflection lens group; 46—reflective focusing lens;

61—deformable reflective lens; 62—serrated aperture.

DETAILED DESCRIPTION OF THE INVENTION

The present invention is further described in connection with the following examples with reference to the drawings. These examples do not serve to limit the scope of the present invention and modification may be made without departing from the scope of the invention.

Example 1

The Example provides a laser driving device as shown in FIG. 1 comprising a laser seed (1), an amplification and transmission unit (2), a frequency conversion unit (3), a focusing unit (4), and a target (5). The laser seed (1) is narrow-band low-spatial-coherence light with a bandwidth of 5 Å; the coherent light is amplified and transmitted through the amplification and transmission unit (2) and subjected to frequency conversion performed by the frequency conversion unit (3), and the light with a converted frequency is focused by the focusing unit (4) to irradiate the target (5) finally.

The amplification and transmission unit (2) in the example, as shown in FIG. 2A, comprises a pre-amplification stage (201), a post-amplification stage (203), and a simplified spatial filter (204); the simplified spatial filter (204) comprises beam expanding lenses 2021, 2023. In a conventional amplification and transmission device as shown in FIG. 2B, a spatial filter (202) comprises not only the beam expanding lenses 2021, 2023, but also a spatial filtering aperture 2022. According to the present invention, the spatial filter can be void of the spatial filtering aperture, so that the difficulty in adjusting the laser device is lowered, while the efficiency of targeting by the laser device is improved.

The frequency conversion unit (3) in the example, as shown in FIG. 3A, performs frequency tripling and specifically comprises a vacuum window (31), a frequency doubling crystal (32), and a frequency tripling crystal (33). In a conventional frequency conversion unit as shown in FIG. 3B, a fundamental-frequency random-phase mask (30) and a frequency-doubling random-phase mask (34) are further included. According to the present invention, the fundamental-frequency random-phase mask (30) and the frequency-doubling random-phase mask (34) are removed, rendering a simpler mechanism so that the difficulty in adjusting the laser device is lowered.

Figure 4:
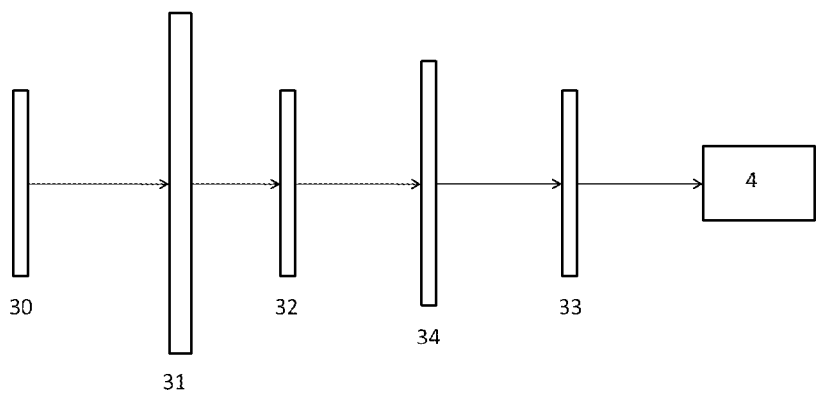
FIG. 4 shows a focusing unit (4) of the laser driving device according to the present invention.
Figure 4:
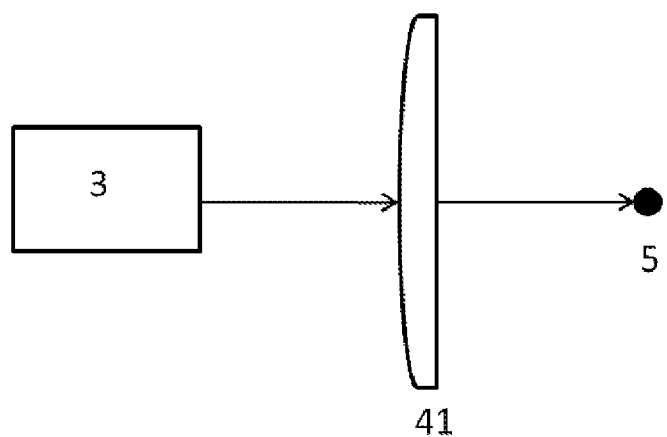

In the example, the focusing unit (4), as shown in FIG. 4, is an aspherical lens (41).

FIGS. 5A and 5B shows the output of the laser driving device based on low-spatial-coherence light in the near field (FIG. 5A) and the far field (FIG. 5B) according to the example.

Example 2

The frequency conversion unit (3) of the example, as shown in FIG. 6, performs frequency quadrupling, and specifically, comprises the vacuum window (31), the frequency doubling crystal (32), the frequency tripling crystal (33), and a frequency quadrupling crystal (35).

In the example, the focusing unit (4), as shown in FIG. 7, is a wedge-shaped focusing lens (42).

Example 3

Figure 8:
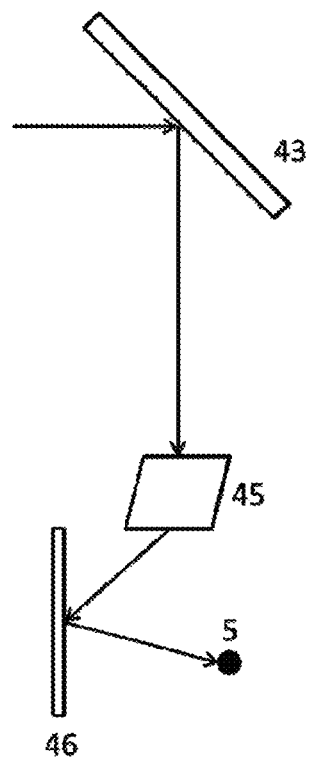
FIG. 8 shows the focusing unit (4) of the laser driving device according to the present invention.

As shown in FIG. 8, the focusing unit (4) in the example comprises a deformable reflective lens (43), a beam deflection lens group (45), and a reflective focusing lens (46).

Example 4

Figure 9:
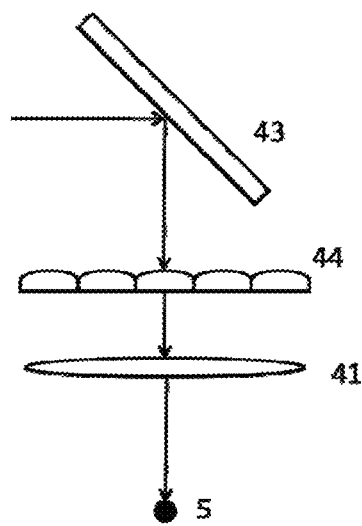
FIG. 9 shows the focusing unit (4) of the laser driving device according to the present invention.

As shown in FIG. 9, the focusing unit (4) in the example comprises the deformable reflective lens (43), arrayed lenses (44), and an aspheric lens (41).

Example 5

Figure 10:
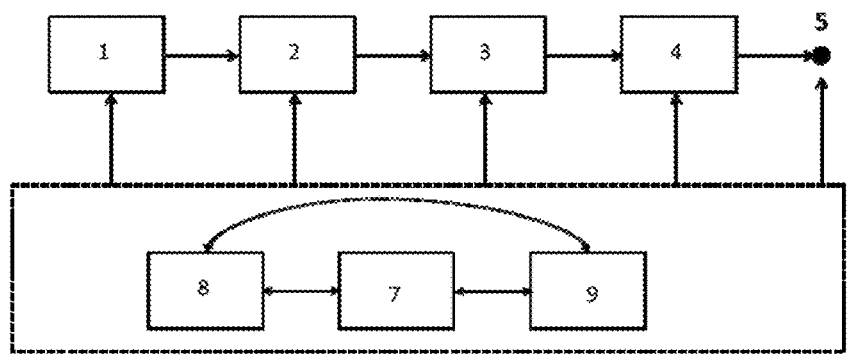
FIG. 10 shows a structure of the laser driving device, including a collimation component (8), a measurement unit (7), and a control component (9).

Example 5 is based on Example 1 and further comprises a collimation component 8, a measurement unit 7, and a control component 9, as shown in FIG. 10. The collimation component 8 collimates each light beam in the laser driving device, the measurement unit 7 measures various signals in the laser driving device, and the control component 8 controls various signals in the laser driver. The collimation component 8, the measurement unit 7, and the control component 9 can assist the laser driving device in targeting with high efficiency and high quality.

Example 6

Figure 11:
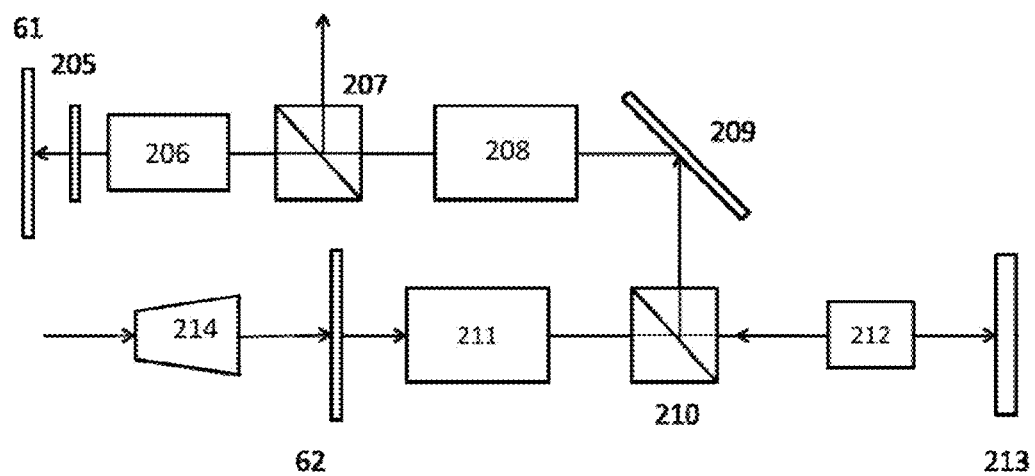
FIG. 11 shows a structure of the laser driving device including a beam shaping component.

The example is based on Example 1 and incorporates a beam shaping component (6) into the amplification and transmission unit (2) as shown in FIG. 11. The light beam shaping component (6) effectively controls intensities and phases of a light beam and comprises a deformable reflective lens (61) and a serrated aperture (62). The amplification and transmission unit (2) comprises a ¼ wave plate (205), a rod-shaped laser head of amplification gain medium (206), a first polarizing beam-splitter prism (207), an intracavity spatial filter (208), a first reflective lens (209), a second polarizing beam-splitter prism (210), a spatial transmission filter (211), a Faraday rotator (212), a second reflective lens (213), and a beam expander (214).

Example 7

Figure 12:
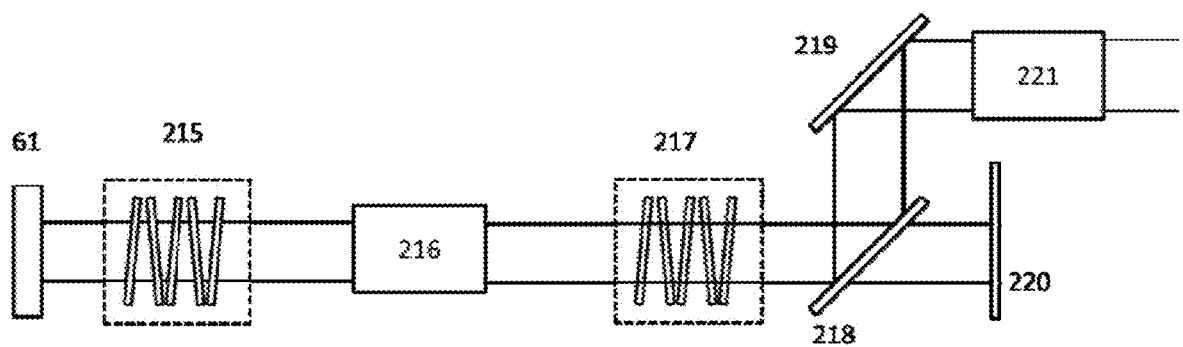
FIG. 12 shows a structure of the laser driving device including the beam shaping component.

The example is based on Example 1 and incorporates the beam shaping component (6) into the amplification and transmission unit (2) as shown in FIG. 12. The beam shaping component (6) comprises the deformable reflective lens (61). The amplification and transmission unit (2) comprises a first sheet-shaped laser head of amplification gain medium (215), a first spatial filter (216), a second sheet-shaped laser head of amplification gain medium (217), a polarizing emission lens (218), a first total reflection lens (219), a second total reflection lens (220), and a second spatial filter (221).

Example 8

Figure 13:
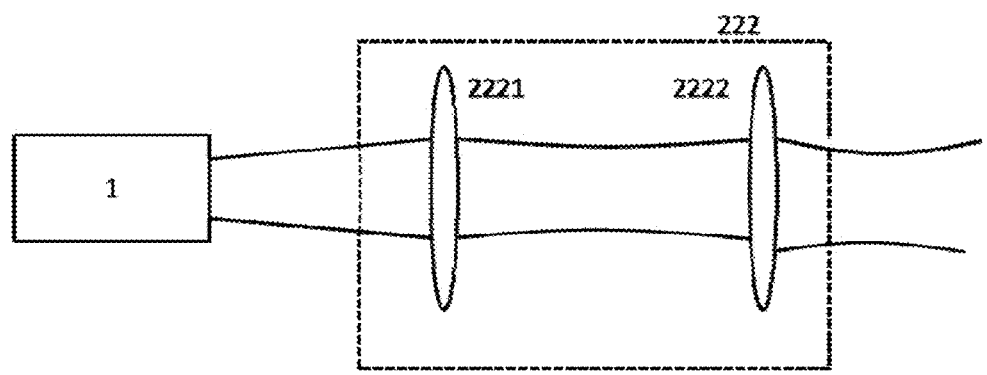
FIG. 13 shows a spatial transmission means in the amplification and transmission unit (2) of the laser driving device according to the present invention.

The spatial transmission device (222) in the amplification and transmission unit (2) in this Example, as shown in FIG. 13, comprises a first lens (2221) and a second lens (2222), and the spatial transmission means (222) is placed behind the laser seed (1) and in front of the spatial filter to narrow the divergence angle of the laser.

The present invention improves the uniformity of the light field output by the laser driving device, solves the problems of low efficiency of frequency multiplier caused by a broad spectral band and damage to optical elements caused by reduced self-focusing, breaks through the energy limit caused by limited damage resistance capability bearable for ultraviolet elements, increases the overall energy output of the laser driving device, and thus improves the overall efficiency of the laser device.

We claim:

1. A laser driving device, comprising:
    a laser seed (1),
    an amplification and transmission unit (2),
    a frequency conversion unit (3), and
    a focusing unit (4),
    wherein the laser seed (1) is a narrow-band low-spatial-coherence light source with a bandwidth of no more than 5 Å and configured for generating a narrow-band low-spatial-coherence laser,
    the amplification and transmission unit (2) is configured for amplifying and transmitting the laser, wherein the amplification and transmission unit (2) comprises one or more amplification gain media, and the amplification gain media are plate- or sheet-shaped,
    the frequency conversion unit (3) is configured for converting frequencies of the laser, and
    the focusing unit (4) is configured for laser focusing;
    the laser seed (1) generates a narrow-band low-spatial-coherence light, the narrow-band low-spatial-coherence light is amplified by the amplification and transmission unit (2) and is subjected to frequency conversion performed by the frequency conversion unit (3), and then the light with a converted frequency is focused by the focusing unit (4).

2. The laser driving device according to claim 1, wherein a modulus of a complex spatial coherence of a light field of the laser from the laser seed (1) is less than 0.5.

3. The laser driving device according to claim 1, further comprising
    a spatial transmission device (222) for controlling a divergence angle of a light beam to regulate the transmission of the laser beam,
    wherein the spatial transmission device (222) is placed behind the laser seed (1) and in front of the amplification and transmission unit (2) in the optical pathway.

4. The laser driving device according to claim 1, wherein the frequency conversion performed by the frequency conversion unit (3) is frequency doubling, frequency tripling, or frequency quadrupling.

5. The laser driving device according to claim 1, wherein the focusing unit (4) comprises an optical element for focusing.

6. The laser driving device according to claim 1, wherein the focusing unit (4) further comprises arrayed lenses or arrayed orthogonal cylindrical lenses.

7. The laser driving device according to claim 1, wherein the focusing unit (4) further comprises an optical element for adjusting phases.

8. The laser driving device according to claim 1, further comprising
    a beam shaping component (6) configured for controlling intensities and phases of a light beam.

9. The laser driving device according to claim 8, wherein the beam shaping component (6) is one or more of a serrated aperture, a birefringent lens group in conjunction with a neutral density filter, an amplitude-type binary optical panel, a phase-type binary optical panel, a binary transmittance liquid crystal cell, an amplitude-type electrical addressing modulator, an amplitude-type optical addressing modulator, a phase-type electrical addressing spatial light modulator, and an adaptive optical component.

10. The laser driving device according to claim 1, further comprising a collimation component (8) for collimating each light beam in the laser driving device.

11. A method for enabling a uniform light field using the device of claim 1, comprising
    adopting a narrow-band low-spatial-coherence light source as the laser seed (1),
    amplifying light by the amplification and transmission unit (2) to obtain an amplified light,
    subjecting the amplified light to frequency conversion by the frequency conversion unit (3), and converting the amplified light to a light with a converted frequency, and
    focusing the light with the converted frequency by the focusing unit (4) to obtain a light field with uniform near and far fields.

* * * * *